United States Patent
Falkinder et al.

(10) Patent No.: US 11,550,493 B2
(45) Date of Patent: Jan. 10, 2023

(54) CONTAINER INDEX INCLUDING A TRACKING DATA STRUCTURE

(71) Applicants: David Malcolm Falkinder, Bristol (GB); Richard Phillip Mayo, Bristol (GB)

(72) Inventors: David Malcolm Falkinder, Bristol (GB); Richard Phillip Mayo, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 17/091,043

(22) Filed: Nov. 6, 2020

(65) Prior Publication Data
US 2022/0147263 A1  May 12, 2022

(51) Int. Cl.
 *G06F 3/06* (2006.01)
 *H04L 9/06* (2006.01)
(52) U.S. Cl.
 CPC .......... *G06F 3/0655* (2013.01); *G06F 3/0652* (2013.01); *G06F 3/0676* (2013.01); *G06F 3/0679* (2013.01); *H04L 9/0643* (2013.01)
(58) Field of Classification Search
 CPC .... G06F 3/0679; G06F 3/0643; G06F 3/0652; G06F 3/0655
 USPC ....................................................... 711/154
 See application file for complete search history.

(56) References Cited

U.S. PATENT DOCUMENTS

| | | | |
|---|---|---|---|
| 9,306,988 B2 | 4/2016 | Barton et al. | |
| 9,372,941 B2 | 6/2016 | Jones | |
| 9,507,812 B2 | 11/2016 | Bestler et al. | |
| 10,621,151 B2 | 4/2020 | Ghanbari et al. | |
| 2011/0040763 A1* | 2/2011 | Lillibridge | G06F 11/1453 707/737 |
| 2012/0158672 A1* | 6/2012 | Oltean | G06F 16/13 707/692 |
| 2013/0275696 A1* | 10/2013 | Hayasaka | G06F 3/0641 711/162 |
| 2016/0299818 A1* | 10/2016 | Vijayan | G06F 16/113 |
| 2018/0145983 A1* | 5/2018 | Bestler | H04L 9/3236 |
| 2018/0316780 A1* | 11/2018 | Baird | G06F 9/547 |

OTHER PUBLICATIONS

Debnath et al.; "ChunkStash: Speeding up Inline Storage Deduplication using Flash Memory"; Jun. 2010; 15 pages.
Lillibridge, M., et al.; "Sparse Indexing: Large Scale, Inline Deduplication Using Sampling and Locality"; Jan. 2009; 13 pages.
(Continued)

*Primary Examiner* — Hashem Farrokh
(74) *Attorney, Agent, or Firm* — Trop, Pruner & Hu, P.C.

(57) ABSTRACT

Example implementations relate to metadata operations in a storage system. An example includes a storage controller loading a manifest from persistent storage into memory, and loading a first container index from persistent storage into the memory. The first container index is associated with the manifest loaded into the memory. The storage controller determines whether a tracking data structure of the first container index includes an identifier of the manifest. In response to a determination that the tracking data structure of the first container index does not include the identifier of the manifest, the storage controller discards the manifest.

20 Claims, 10 Drawing Sheets

(56) References Cited

OTHER PUBLICATIONS

The Kernel Development Community, BFQ (Budget Fair Queueing), retrieved on Sep. 15, 2020, 10 pages.
The Kernel Development Community, CFQ (Complete Fairness Queueing), retrieved on Sep. 15, 2020, 5 pages.
The Kernel Development Community, Deadline IO scheduler tunables, Retrieved on Sep. 15, 2020, 2 pages.
The Kernel Development Community, Kyber I/O scheduler tunables, Retrieved on Sep. 15, 2020, 1 page.
Ubuntu Wiki, IOSchedulers, Sep. 10, 2019, 4 pages.
Wikipedia, "Elevator algorithm," Jan. 8, 2020; 3 pages.
Wikipedia, "I/O scheduling," Dec. 31, 2019; 3 pages.
Wikipedia, "Tagged Command Queuing," Sep. 30, 2019; 4 pages.
Brandur Leach, "How Postgres Makes Transactions Atomic", available online at <https://brandur.org/postgres-atomicity>, Aug. 16, 2017, 14 pages.

* cited by examiner

CONTAINER INDEX INCLUDING A TRACKING DATA STRUCTURE

BACKGROUND

Data reduction techniques can be applied to reduce the amount of data stored in a storage system. An example data reduction technique includes data deduplication. Data deduplication identifies data units that are duplicative, and seeks to reduce or eliminate the number of instances of duplicative data units that are stored in the storage system.

BRIEF DESCRIPTION OF THE DRAWINGS

Some implementations are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, a storage system may deduplicate data to reduce the amount of space required to store the data. The storage system may perform a deduplication process including breaking a stream of data into discrete data units or "chunks." Further, the storage system may determine identifiers or "fingerprints" of incoming data units, and may determine which incoming data units are duplicates of previously stored data units. In the case of data units that are duplicates, the storage system may store references to the previous data units instead of storing the duplicate incoming data units.

As used herein, the term "fingerprint" refers to a value derived by applying a function on the content of the data unit (where the "content" can include the entirety or a subset of the content of the data unit). An example of the function that can be applied includes a hash function that produces a hash value based on the incoming data unit. Examples of hash functions include cryptographic hash functions such as the Secure Hash Algorithm 2 (SHA-2) hash functions, e.g., SHA-224, SHA-256, SHA-384, etc. In other examples, other types of hash functions or other types of fingerprint functions may be employed.

A "storage system" can include a storage device or an array of storage devices. A storage system may also include storage controller(s) that manage(s) access of the storage device(s). A "data unit" can refer to any portion of data that can be separately identified in the storage system. In some cases, a data unit can refer to a chunk, a collection of chunks, or any other portion of data. In some examples, a storage system may store data units in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof.

A "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

In some examples, a deduplication storage system may use metadata for processing an inbound data stream. For example, such metadata may include data recipes (also referred to herein as "manifests") that specify the order in which particular data units are received (e.g., in a data stream). Subsequently, in response to a read request, the deduplication system may use a manifest to determine the received order of data units, and may thereby recreate the original data stream. The manifest may include a sequence of records, with each record representing a particular set of data unit(s).

The records of the manifest may include one or more fields (also referred to herein as "pointer information") that identify indexes that include storage information for the data units. For example, the storage information may include one or more index fields that specify location information (e.g., containers, offsets, etc.) for the stored data units, compression and/or encryption characteristics of the stored data units, and so forth. In some examples, the manifests and indexes may each be read in addressable portions of fixed sizes (e.g., 4 KB portions).

In some examples, while processing an inbound data stream, the deduplication system may generate and update data objects in memory. For example, such data objects may include data containers, manifests (specifying the received order of the data units), and container indexes (specifying storage information such as identifiers of data containers, offsets, and so forth). However, such data objects that are only present in memory may be lost during a power loss or system error. Accordingly, at various times during operation, the deduplication system may write such data objects from memory to persistent storage (also referred to herein as "persisting" each object).

In some examples, a conventionally-ordered process for persisting a set of manifests may include, for each manifest, persisting one or more data containers associated with the manifest, then persisting one or more container indexes associated with the manifest, and finally persisting the manifest itself. Further, to ensure transactional integrity of the data objects, persisting a first manifest and its associated data objects must be successfully completed before continuing to persisting another manifest and its associated data objects. However, in some examples, multiple manifests may be associated with the same data containers and container indexes. Therefore, when persisting multiple manifests, the same associated data containers and container indexes may be persisted multiple times. Accordingly, such conventionally-ordered persistence operations may involve duplicated and inefficient writes to persistent storage, and may thus result in relatively slow and/or inefficient deduplication operations.

In accordance with some implementations of the present disclosure, a storage system may use container indexes in memory that include tracking data. The tracking data of each container index may include identifiers of manifests that are associated with the container index. For example, if a container index in memory is updated based on a particular manifest, the identifier of the particular manifest may be added to the tracking data structure of that container index. Subsequently, in response to a persistence requirement, a controller may persist a particular manifest without first persisting its associated data objects (e.g., a container index and/or data container). Rather, the associated data objects may be persisted at some point in time after persisting the particular manifest. Further, because multiple manifests may be associated with the same set of data objects, a single write of this set of data objects may be sufficient to persist the data associated with the multiple manifests.

Subsequently, in the event of a restart after a power loss or system failure (referred to herein as "reset events"), the tracking data structure of the container index may be examined to determine whether it includes the identifier of the manifest. If not, it may be determined that the manifest and/or its associated data objects were not properly persisted, and thus the manifest may be discarded. As such, a loss of transactional integrity resulting from not using a conventionally-ordered persistence operation may be avoided (i.e., by not using a manifest that was not properly persisted along with its associated data objects). In this manner, the storage system may be able to persist manifests without first having to persist the associated container indexes and data containers. Accordingly, some implementations may reduce the amount of duplicated data writes associated with persistence operations.

1. Example Storage System

Figure 1:
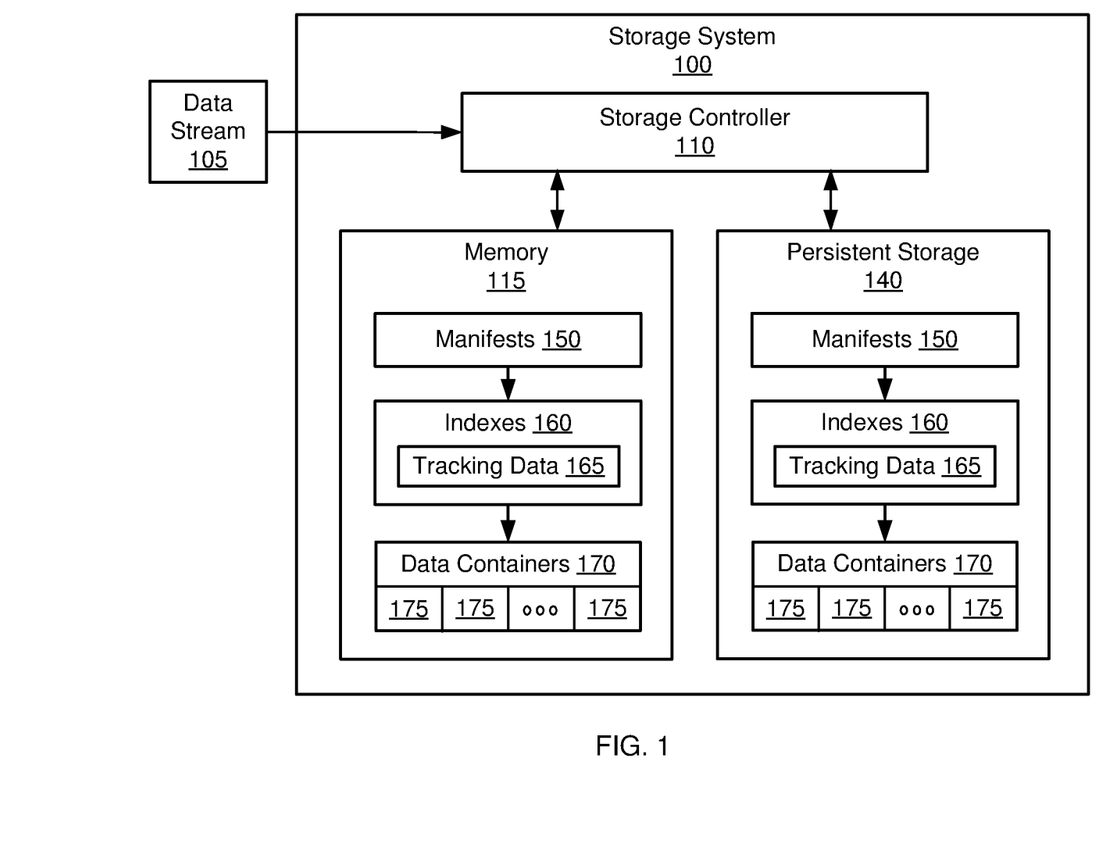
FIG. 1 is a schematic diagram of an example storage system, in accordance with some implementations.

FIG. 1 shows an example of a storage system 100 that includes a storage controller 110, memory 115, and persistent storage 140, in accordance with some implementations. As shown, the persistent storage 140 may include any number of manifests 150, container indexes 160, and data containers 170. The persistent storage 140 may include one or more non-transitory storage media such as hard disk drives (HDDs), solid state drives (SSDs), optical disks, and so forth, or a combination thereof. The memory 115 may be implemented in semiconductor memory such as random access memory (RAM).

In some implementations, the storage system 100 may perform deduplication of a received data stream 105. For example, the storage controller 110 may divide the received data stream 105 into data units, and may store at least one copy of each data unit in a data container 170 (e.g., by appending the data units to the end of the container 170). In some examples, each data container 170 may be divided into entities 175, where each entity 175 includes multiple stored data units.

In one or more implementations, the storage controller 110 may generate a fingerprint for each data unit. For example, the fingerprint may include a full or partial hash value based on the data unit. To determine whether an incoming data unit is a duplicate of a stored data unit, the storage controller 110 may compare the fingerprint generated for the incoming data unit to the fingerprints of the stored data units. If this comparison results in a match, then the storage controller 110 may determine that a duplicate of the incoming data unit is already stored by the storage system 100.

In some implementations, the storage controller 110 may generate a manifest 150 to record the order in which the data units were received in the data stream 105. Further, the manifest 150 may include a pointer or other information indicating the container index 160 that is associated with each data unit. In some implementations, the associated container index 160 may indicate the location in which the data unit is stored. For example, the associated container index 160 may include information specifying that the data unit is stored at a particular offset in an entity 175, and that the entity 175 is stored at a particular offset in a data container 170.

In some implementations, the storage controller 110 may receive a read request to access the stored data, and in response may access the manifest 150 to determine the sequence of data units that made up the original data. The storage controller 110 may then use pointer data included in the manifest 150 to identify the container indexes 160 associated with the data units. Further, the storage controller 110 may use information included in the identified container indexes 160 to determine the locations that store the data units (e.g., data container 170, entity 175, offsets, etc.), and may then read the data units from the determined locations. In some implementations, each container index 160 may include tracking data 165. When the container index 160 is generated or updated to include information regarding a particular manifest 150, the tracking data 165 may be updated to include an identifier of that manifest 150.

2. Example Data Structures

Figure 2:
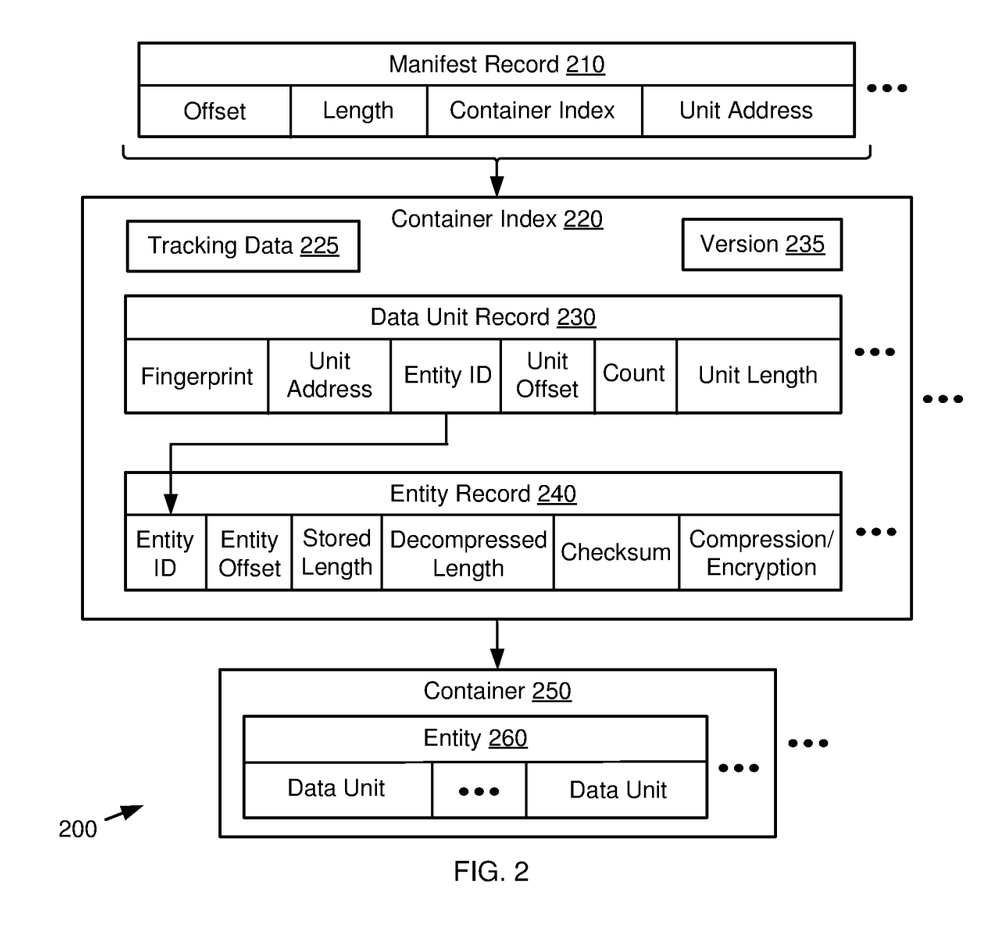
FIG. 2 is an illustration of example data structures, in accordance with some implementations.

Referring now to FIG. 2, shown is an illustration of example data structures 200 used in deduplication, in accordance with some implementations. As shown, the data structures 200 may include a manifest record 210, a container index 220, a container 250, and an entity 260. In some examples, the manifest record 210, the container index 220, the container 250, and the entity 230 may correspond generally to example implementations of a manifest record 155, an index 160, a data container 170, and an entity 175 (shown in FIG. 1), respectively. In some examples, the data structures 200 may be generated and/or managed by the storage controller 110 (shown in FIG. 1).

As shown in FIG. 2, in some examples, the manifest record 210 may include various fields, such as offset, length, container index, and unit address. In some implementations, each container index 220 may include any number of data unit record(s) 230 and entity record(s) 240. Each data unit record 230 may include various fields, such as a fingerprint (e.g., a hash of the data unit), a unit address, an entity identifier, a unit offset (i.e., an offset of the data unit within the entity), a count value, and a unit length. Further, each entity record 240 may include various fields, such as an entity identifier, an entity offset (i.e., an offset of the entity within the container), a stored length (i.e., a length of the data unit within the entity), a decompressed length, a checksum value, and compression/encryption information (e.g., type of compression, type of encryption, and so forth). In some implementations, each container 250 may include any number of entities 260, and each entity 260 may include any number of stored data units.

In some implementations, each container index 220 may include a tracking data structure 225 and a version number 235. The tracking data structure 225 may correspond generally to example implementation of the tracking data 165 included in the container index 160 (shown in FIG. 1). When the container index 220 is generated or updated to include information regarding a particular manifest, the tracking data structure 225 may store an identifier of that manifest.

In some implementations, the version number 235 may indicate a generation or relative age of the metadata in the container index. For example, the version number 235 may be compared to a version number of an associated journal (not shown in FIG. 2). If the version number 235 is greater than the version number of the associated journal, it may be determined that the container index 220 includes newer metadata than the associated journal.

In one or more implementations, the data structures 200 may be used to retrieve stored deduplicated data. For example, a read request may specify an offset and length of data in a given file. These request parameters may be matched to the offset and length fields of a particular manifest record 210. The container index and unit address of the particular manifest record 210 may then be matched to a particular data unit record 230 included in a container index 220. Further, the entity identifier of the particular data unit record 230 may be matched to the entity identifier of a particular entity record 240. Furthermore, one or more other fields of the particular entity record 240 (e.g., the entity offset, the stored length, checksum, etc.) may be used to identity the container 250 and entity 260, and the data unit may then be read from the identified container 250 and entity 260.

3. Example Tracking Data Structure

Figure 3:
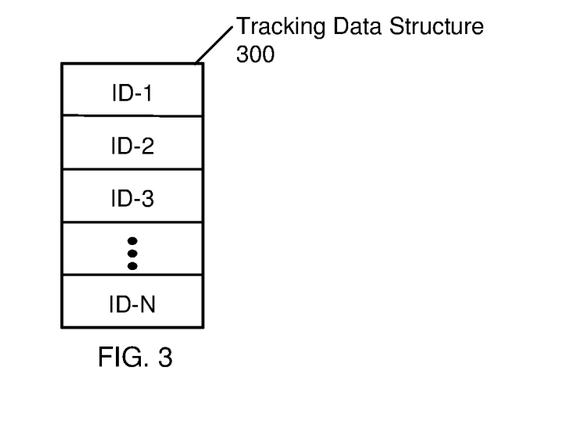
FIG. 3 is an illustration of an example tracking data structure, in accordance with some implementations.

Referring now to FIG. 3, shown is an example tracking data structure 300 in accordance with some implementations. In some examples, the tracking data structure 300 may correspond generally to example implementation of the tracking data 225 included in the container index 220 (shown in FIG. 2). As shown in FIG. 3, the tracking data structure 300 may include a given number of identifiers ("ID") that each uniquely identify a particular manifest. In some implementations, only one instance of each identifier may be stored in the tracking data structure 300.

In some implementations, when a container index is generated or updated to include data from a particular manifest, an identifier of that manifest may be added to the tracking data structure 300 included in the container index. Further, an identifier may be removed from the tracking data structure 300 when the container index is no longer associated with the identified manifest. For example, in the event that a particular manifest is deleted from a deduplication storage system, the identifier of the particular manifest may be removed from the tracking data structure 300 of a container index associated with that manifest. An example process for removing identifiers from the tracking data structure 300 is described below with reference to FIG. 8.

In some implementations, the tracking data (e.g., the number of manifest identifiers) that can be stored in the tracking data structure 300 may be capped at a maximum threshold (e.g., 32,000 entries). For example, the number of stored identifiers may be capped to prevent the tracking data structure 300 from becoming larger than a desired size in memory. In this manner, the number of manifests that can use a given container index is limited to the maximum level. Two example processes for capping the tracking data in container indexes are described below with reference to FIGS. 6-7.

4. Example Process for Generating Tracking Data

Figure 4:
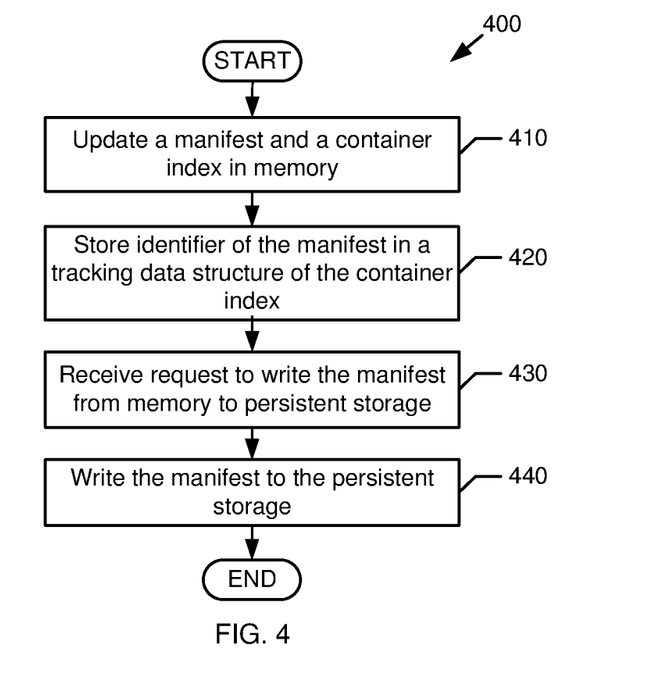
FIG. 4 is an illustration of an example process, in accordance with some implementations.

Referring now to FIG. 4, shown is an example process 400 for generating tracking data, in accordance with some implementations. In some examples, the process 400 may be performed continually during the deduplication processing of an inbound data stream. For example, referring to FIG. 1, the storage controller 110 may perform the process 400 while deduplicating each inbound data stream 105.

Block 410 may include updating a manifest and an associated container index in memory. Block 420 may include storing the identifier of the manifest in a tracking data structure of the associated container index. For example, referring to FIG. 1, the storage controller 110 may receive a data stream 105, and may generate and/or update a manifest 150 to record the order in which data units are received in the data stream 105. Further, the storage controller 110 may generate and/or update an associated container index 160 that indicates the locations in which the received data units are stored (e.g., identifiers of data containers, offsets) and other associated metadata. The storage controller 110 may then add a unique identifier of the manifest 150 to the tracking data 225 of the associated container index 160.

Block 430 may include receiving a request to write a manifest from memory to persistent storage. Block 440 may include writing the manifest from the memory to the persistent storage. For example, referring to FIG. 1, the storage controller 110 may receive a persistence command for a particular manifest 150, and in response may write the particular manifest 150 from memory 115 to the persistent storage 140. In some examples, the persistence command may only cause the particular manifest 150 to be persisted (i.e., without concurrently persisting any associated container indexes 160 or data containers 170). Further, in some examples, the persistence command may be generated when the particular manifest 150 is no longer needed in the memory 115 (e.g., when the processing the input data associated with the manifest 150 has been completed). The process 400 may terminate after block 440.

5. Example Process for Using Tracking Data

Figure 5:
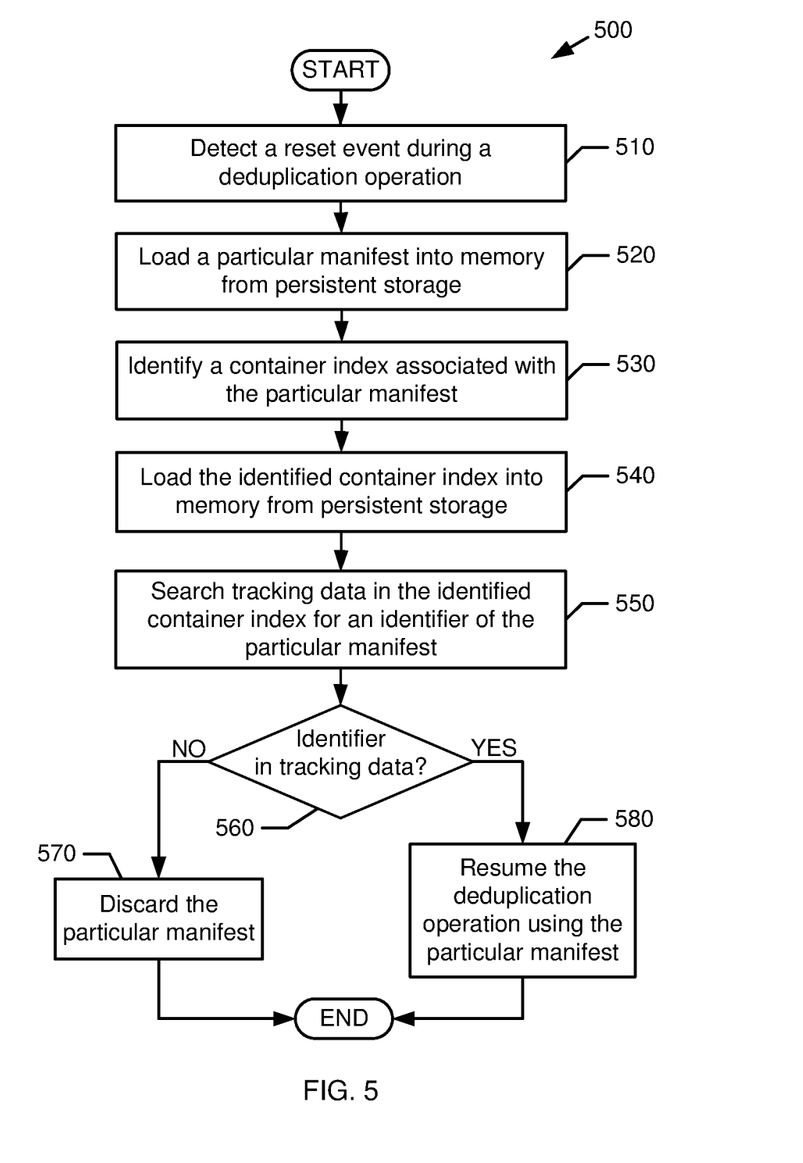
FIG. 5 is an illustration of an example process, in accordance with some implementations.

Referring now to FIG. 5, shown is an example process 500 for using tracking data, in accordance with some implementations. In some examples, the process 500 may be performed in response to a reset event that occurs during deduplication of an inbound data stream. For example, referring to FIG. 1, the storage controller 110 may perform the process 500 while restarting after a power failure or system error.

Block 510 may include detecting a reset event during a deduplication operation. Block 520 may include loading a particular manifest into memory from persistent storage. For example, referring to FIG. 1, the storage controller 110 may detect that the storage system 100 has been reset or restarted while deduplicating a received data stream 105 (e.g., due to power loss or system failure). In response to this detection, the storage controller 110 may attempt to resume the deduplication operation by reloading associated data objects into the memory 115, including a particular manifest 150 that indicates the received order of data units in the data stream 105.

Block 530 may include identifying a container index associated with the particular manifest. Block 540 may include loading the identified container index into the memory from the persistent storage. For example, referring to FIGS. 1-2, the storage controller 110 may read one or more fields of the particular manifest 150 that was loaded into memory ((e.g., the "container index" field shown in FIG. 2). Further, the storage controller 110 may identify a particular container index 160 that matches the one or more fields of the particular manifest 150, and may load the identified container index 160 into the memory 115.

Block 550 may include searching tracking data in the identified container index for an identifier of the particular manifest. Decision block 560 may include determining whether the identifier of the particular manifest is included in the tracking data. If not, then the process 500 may continue at block 570, which may include discarding the particular manifest. Otherwise, if it is determined at block 560 that the identifier of the particular manifest is included in the tracking data, then the process 500 may continue at block 580, which may include resuming the deduplication operation using the particular manifest. For example, referring to FIGS. 1-3, the storage controller 110 may search for an identifier of the particular manifest 150 in the tracking data 225 of the identified container index 160. If the identifier of the particular manifest 150 is present in the tracking data 225, then the storage controller 110 may use the particular manifest 150 to resume the deduplication operation that was interrupted by the reset event. However, if the identifier of the particular manifest 150 is not present in the tracking data 225, then the storage controller 110 may cause the particular manifest 150 to be removed from the memory 115. After either block 570 or block 580, the process 500 may be completed.

6. Example Process for Capping Tracking Data in a Container Index

Figure 6:
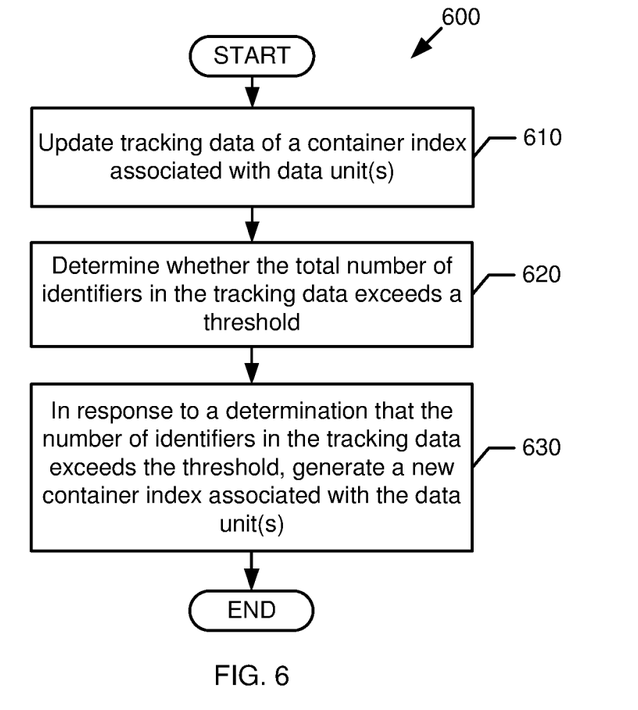
FIG. 6 is an illustration of an example process, in accordance with some implementations.

Referring now to FIG. 6, shown is an example process 600 for capping tracking data in a container index, in accordance with some implementations. In some examples, the process 600 may be performed to prevent the tracking data in a container index (e.g., the tracking data structure 300 shown in FIG. 3) from becoming larger than a desired size in memory.

Block 610 may include updating tracking data of a container index associated with a set of data unit(s). Block 620 may include determining whether the total number of identifiers in the tracking data exceeds a threshold. Block 630 may include, in response to a determination that the number of identifiers in the tracking data exceeds the threshold, generating a new container index associated with the set of data unit(s). For example, referring to FIG. 1-3, the storage controller 110 may add identifiers to the tracking data structure 300 of an existing container index, where each identifier identifies a different manifest that includes data unit(s) that are associated with the container index (e.g., the container index indicates the storage locations of the data unit(s)). The storage controller 110 may determine that the number of identifiers stored in the tracking data structure 300 exceeds a maximum threshold, and in response may generate a new container index to be used from that point in time for those data unit(s), instead of using the existing container index. Stated differently, after reaching the maximum threshold, a new manifest that includes data unit(s) that previously would have been referenced by the existing container index will instead be referenced by the new container index, and therefore the identifier of the new manifest will be added to the tracking data structure 300 of the new container index. Note that, in such implementations, the same data unit(s) can be stored in multiple data containers, and may be referenced in multiple container indexes. After block 630, the process 600 may be terminated.

7. Example Process for Capping Tracking Data in a Container Index

Figure 7:
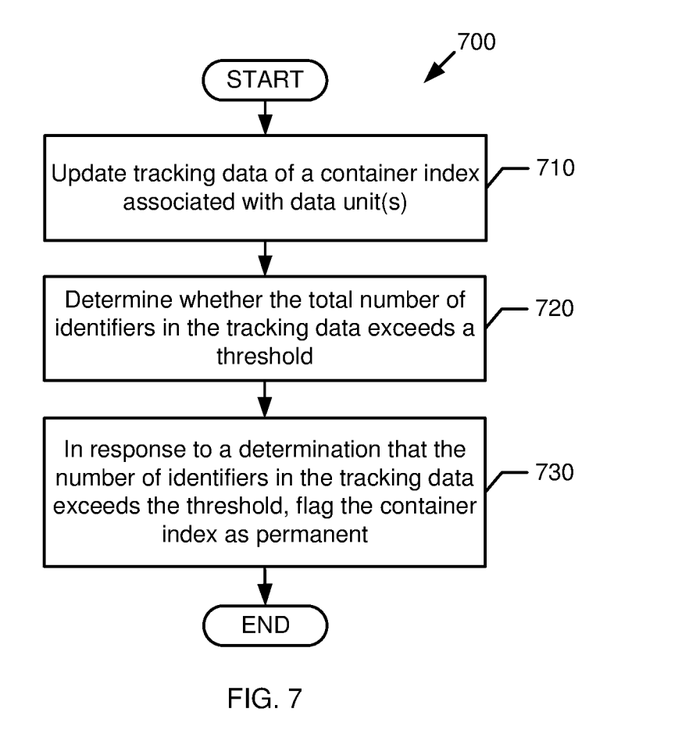
FIG. 7 is an illustration of an example process, in accordance with some implementations.

Referring now to FIG. 7, shown is an example process 700 for capping tracking data in a container index, in accordance with some implementations. In some examples, the process 700 may be performed to prevent the tracking data in a container index (e.g., the tracking data structure 300 shown in FIG. 3) from becoming larger than a desired size in memory.

Block 710 may include updating tracking data of a container index associated with a set of data unit(s). Block 720 may include determining whether the total number of identifiers in the tracking data exceeds a threshold. Block 730 may include, in response to a determination that the number of identifiers in the tracking data exceeds the threshold, flagging the container index as permanent. For example, referring to FIG. 1-3, the storage controller 110 may add identifiers to the tracking data structure 300 of an existing container index, where each identifier identifies a different manifest that includes data unit(s) that are associated with the container index. The storage controller 110 may determine that the number of identifiers stored in the tracking data structure 300 exceeds a maximum threshold, and in response may flag the container index as a permanent container index. In some examples, each container index may include a dedicated field or bit to indicate whether it is flagged as permanent. As used herein, a "permanent container index" refers to a container index that is not deleted based on recent usage in the same manner as other container indexes, but instead is maintained for relatively much longer period of time in comparison to other container indexes. In some implementations, a container index that is flagged as permanent will no longer be updated with new information (e.g., in the data unit record 230, entity record 240, or tracking data structure 225 shown in FIG. 2). For example, the reference count fields of the container index may no longer be updated after it is flagged as permanent. Further, if the container index is only partially filled, it will remain partially filled from the time that it is flagged as permanent. After block 730, the process 700 may be terminated.

8. Example Process for Removing a Manifest

Figure 8:
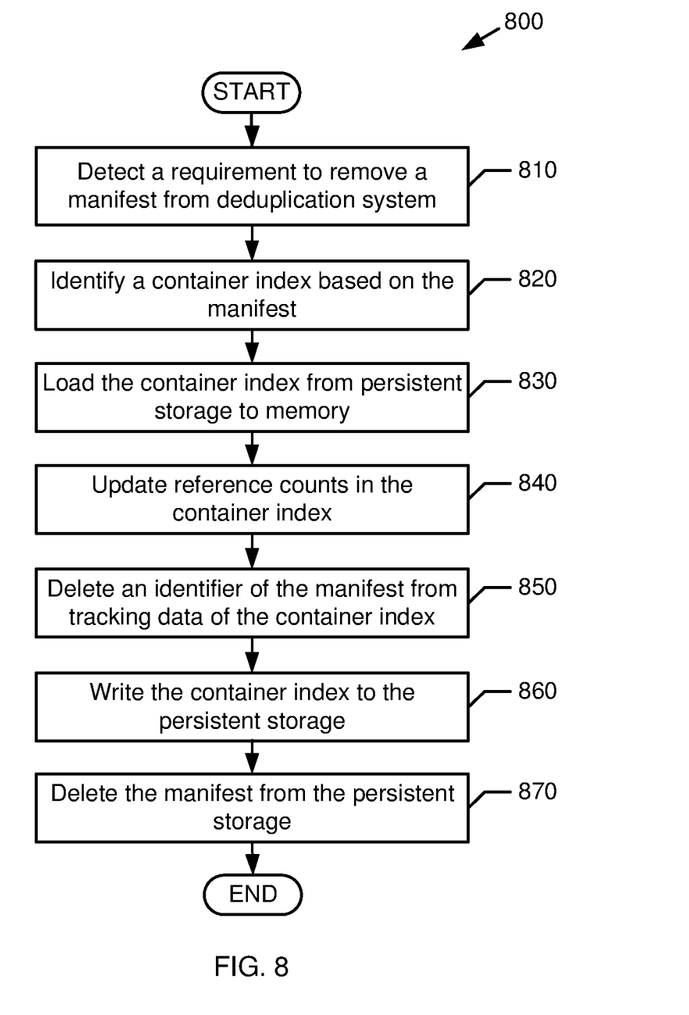
FIG. 8 is an illustration of an example process, in accordance with some implementations.

Referring now to FIG. 8, shown is an example process 800 for removing a manifest, in accordance with some implementations. In some examples, the process 800 may be performed when removing a manifest from the system (e.g., when the associated data stream is obsolete and/or is no longer required). The process 800 may be used to perform out-of-order removals, and may avoid duplicated housekeeping operations (e.g., decrements of reference counts).

Block 810 may include detecting a requirement to remove a manifest from a deduplication system. Block 820 may include identifying a container index based on the manifest. Block 830 may include loading the container index from persistent storage to memory. For example, referring to FIGS. 1-3, the storage controller 110 may detect a command or indication to remove a manifest 150 from the storage system 100 (e.g., if the data stream represented by the manifest 150 is no longer needed). In response to this detection, the storage controller 110 may identify a container index 160 based on one or more fields of the manifest 150 (e.g., using the "container index" field shown in FIG. 2), and may load the identified container index 160 from the persistent storage 140 into the memory 115.

Block 840 may include updating reference counts in the container index. Block 850 may include deleting an identifier of the manifest from tracking data of the container index. Block 860 may include writing the container index to the persistent storage. Block 870 may include deleting the manifest from the persistent storage. For example, referring to FIGS. 1-3, the storage controller 110 may update one or more fields of the container index 220 (e.g., the "count" field shown in FIG. 2) to reflect the deletion of the manifest 150. Further, the storage controller 110 may remove the unique identifier of the manifest from the tracking data 225 of the identified container index 160 (e.g., by removing "ID-2" from the tracking data structure 300 shown in FIG. 3). The storage controller 110 may then write the identified container index 160 from the memory 115 to the persistent storage 140, and may delete the manifest 150 from the persistent storage 140. After block 870, the process 800 may be terminated.

9. Example Process for Using Tracking Data

Figure 9:
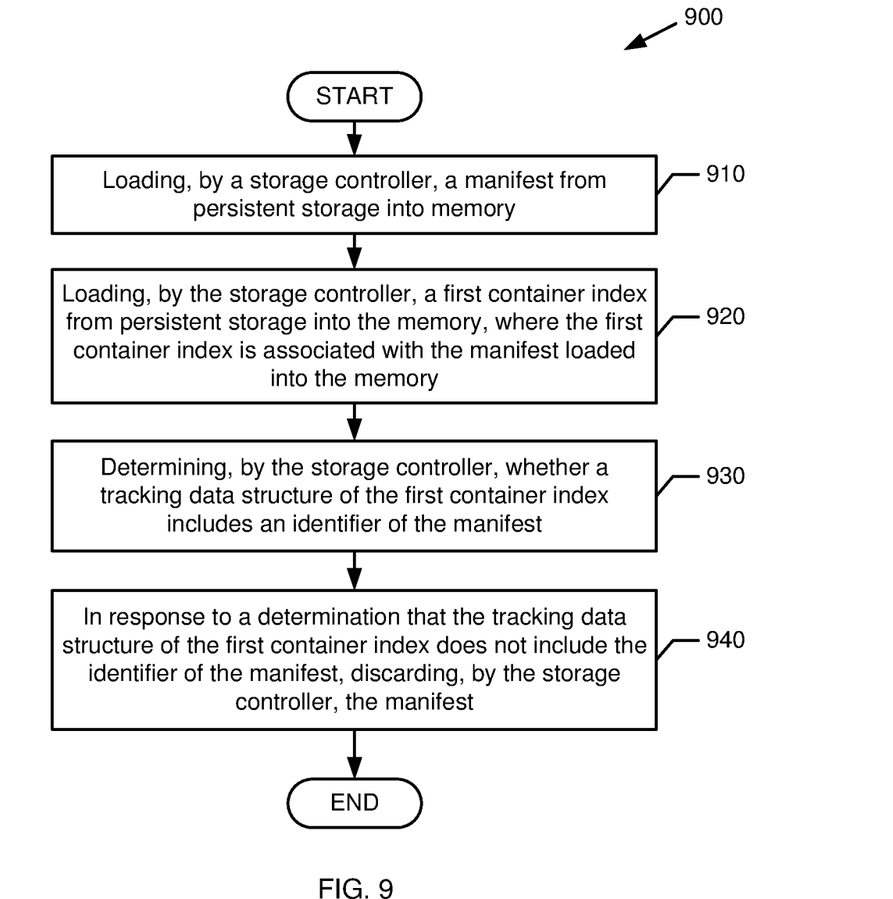
FIG. 9 is an illustration of an example process, in accordance with some implementations.

Referring now to FIG. 9, shown is an example process 900 for using tracking data, in accordance with some implementations. In some examples, the process 900 may be performed to recover or reinitialize a deduplication process after a reset event. For example, referring to FIG. 1, the storage controller 110 may perform the process 500 while restarting after a power failure or system error.

Block 910 may include loading, by a storage controller, a manifest from persistent storage into memory. Block 920 may include loading, by the storage controller, a first container index from persistent storage into the memory, where the first container index is associated with the manifest loaded into the memory. For example, referring to FIGS. 1-3, the storage controller 110 may detect that the storage system 100 has been reset or restarted while deduplicating a received data stream 105 (e.g., due to power loss or system failure). In response to this detection, the storage controller 110 may attempt to resume the deduplication operation by reloading a particular manifest 150 into the memory 115 (e.g., a particular manifest 150 that indicates the received order of data units in the data stream 105). Further, the storage controller 110 may use one or more fields of the manifest 150 (e.g., the "container index" field shown in FIG. 2) to identify a container index 160 that is associated with the manifest 150, and may load the identified container index 160 into the memory 115.

Block 930 may include determining, by the storage controller, whether a tracking data structure of the first container index includes an identifier of the manifest. Block 940 may include, in response to a determination that the tracking data structure of the first container index does not include the identifier of the manifest, discarding, by the storage controller, the manifest. For example, referring to FIGS. 1-3, the storage controller 110 may search for an identifier of the manifest 150 in the tracking data 225 of the identified container index 160. If the identifier of the manifest 150 is present in the tracking data 225, then the storage controller 110 may use the manifest 150 to restore or resume the deduplication operation that was interrupted by the reset event. Otherwise, if the identifier of the manifest 150 is not present in the tracking data 225, then the storage controller 110 may delete the manifest 150 from the memory 115. After block 940, the process 900 may be completed.

10. Example Machine-Readable Medium

Figure 10:
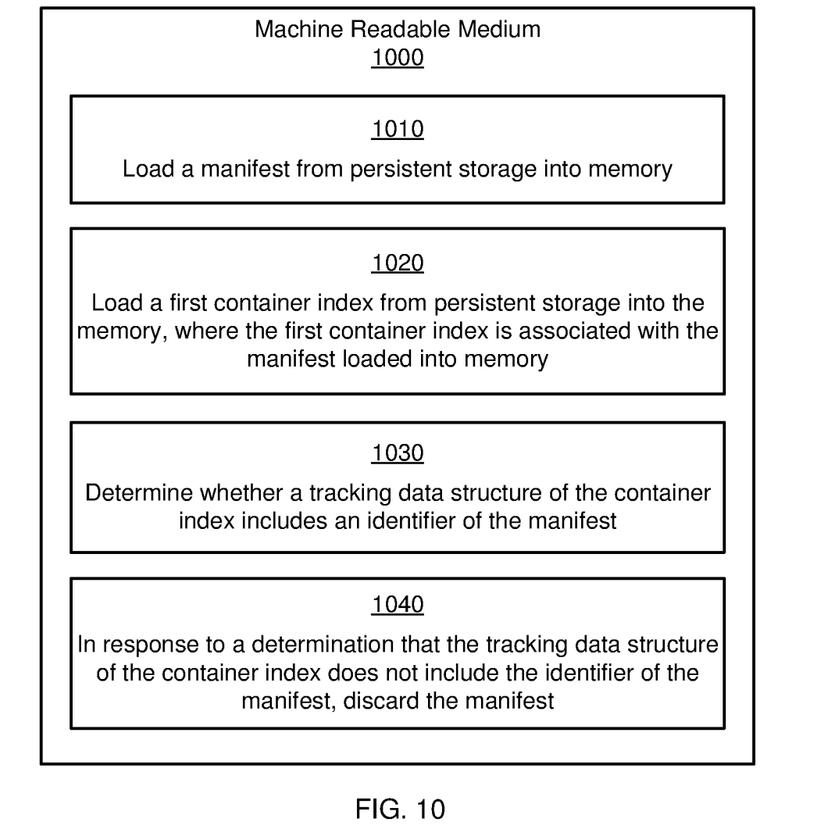
FIG. 10 is a diagram of an example machine-readable medium storing instructions in accordance with some implementations.

FIG. 10 shows a machine-readable medium 1000 storing instructions 1010-1040, in accordance with some implementations. The instructions 1010-1040 can be executed by a single processor, multiple processors, a single processing engine, multiple processing engines, and so forth. The machine-readable medium 1000 may be a non-transitory storage medium, such as an optical, semiconductor, or magnetic storage medium.

Instruction 1010 may be executed to load a manifest portion from persistent storage into memory. Instruction 1020 may be executed to load a first container index from persistent storage into the memory, where the first container index is associated with the manifest portion loaded into memory. Instruction 1030 may be executed to determine whether a tracking data structure of the container index includes an identifier of the manifest. Instruction 1040 may be executed to, in response to a determination that the tracking data structure of the container index does not include the identifier of the manifest, discard the manifest.

11. Example Computing Device

Figure 11:
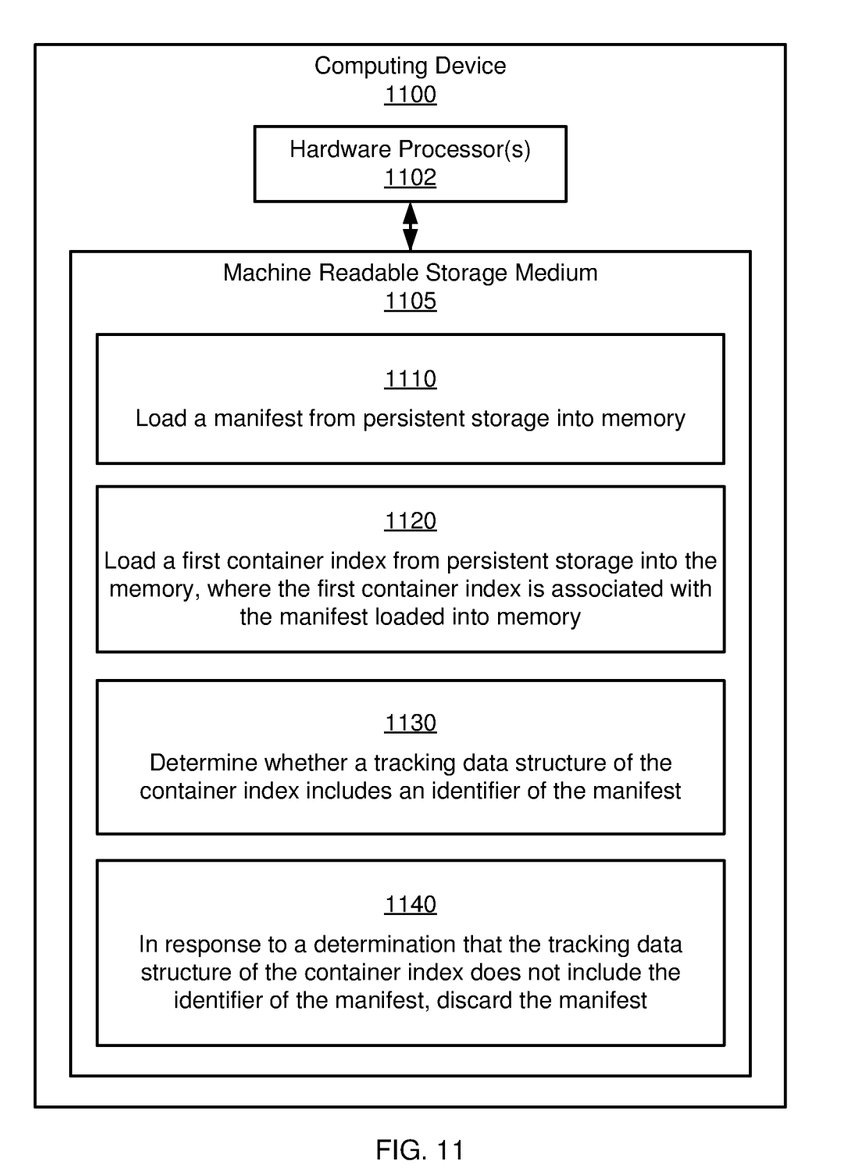
FIG. 11 is a schematic diagram of an example computing device, in accordance with some implementations.

FIG. 11 shows a schematic diagram of an example computing device 1100. In some examples, the computing device 1100 may correspond generally to some or all of the storage system 100 (shown in FIG. 1). As shown, the computing device 1100 may include hardware processor 1102 and machine-readable storage 1105 including instruction 1110-1140. The machine-readable storage 1105 may be a non-transitory medium. The instructions 1110-1140 may be executed by the hardware processor 1102, or by a processing engine included in hardware processor 1102.

Instruction 1110 may be executed to load a manifest portion from persistent storage into memory. Instruction 1120 may be executed to load a first container index from persistent storage into the memory, where the first container index is associated with the manifest portion loaded into memory. Instruction 1130 may be executed to determine whether a tracking data structure of the container index includes an identifier of the manifest. Instruction 1140 may be executed to, in response to a determination that the tracking data structure of the container index does not include the identifier of the manifest, discard the manifest.

In accordance with implementations described herein, a storage system may use container indexes that include tracking data. The tracking data of each container index may include identifiers of manifests that are associated with the container index. In response to a persistence requirement, a controller may persist a particular manifest without also persisting an associated container index and an associated data container. If the particular manifest is successful written to persistent storage, the identifier of the particular manifest may be added to the tracking data structure of the associated container index. Subsequently, in the event of a system restart after a power loss or failure, the tracking data structure of the container index may be examined to determine whether it includes the identifier of the manifest. If not, the manifest can be interpreted as not having been properly persisted, and thus the manifest may be discarded. In this manner, the storage system can persist manifests without having to also persist the associated container indexes and data containers. Accordingly, some implementations may reduce the amount of duplicated data writes associated with persistence operations.

Note that, while FIGS. 1-11 show various examples, implementations are not limited in this regard. For example, referring to FIG. 1, it is contemplated that the storage system 100 may include additional devices and/or components, fewer components, different components, different arrangements, and so forth. In another example, it is contemplated that the functionality of the storage controller 110 described above may be included in any another engine or software of storage system 100. Other combinations and/or variations are also possible.

Referring now to FIGS. 4-9, the illustrated processes (i.e., processes 400, 500, 600, 700, 800, and 900) may be performed using the storage controller 110 (shown in FIG. 1). The illustrated processes may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, some details of the illustrated processes may have been described above with reference to FIGS. 1-3, which show examples in accordance with some implementations. However, other implementations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A method comprising:
    loading, by a storage controller, a manifest from persistent storage into memory, wherein the manifest specifies an order of data units in a data stream;
    loading, by the storage controller, a first container index from persistent storage into the memory, wherein the first container index:
        comprises a tracking data structure including identifiers of manifests;
        includes information specifying storage locations of a plurality of data units; and
        is associated with the manifest loaded into the memory;
    determining, by the storage controller, whether the tracking data structure of the first container index includes an identifier of the manifest; and
    in response to a determination that the tracking data structure of the first container index does not include the identifier of the manifest, discarding, by the storage controller, the manifest.

2. The method of claim 1, comprising:
    in response to a determination that the tracking data structure of the first container index includes the identifier of the manifest, resuming a deduplication operation using the manifest.

3. The method of claim 2, comprising:
    prior to loading the manifest from the persistent storage into the memory, detecting a reset event during the deduplication operation; and
    in response to a detection of the reset event during the deduplication operation, loading the manifest from the persistent storage into the memory.

4. The method of claim 2, comprising, prior to loading the manifest from the persistent storage into the memory:
    updating the manifest in memory during the deduplication operation;
    updating the first container index based on the updated manifest; and
    after updating the first container index based on the updated manifest, storing an identifier of the manifest in the tracking data structure of the first container index.

5. The method of claim 1, comprising, prior to loading the first container index from the persistent storage into the memory:
    identifying the first container index based on at least one field of the manifest loaded into the memory; and
    in response to an identification of the first container index based on at least one field, loading the first container index from the persistent storage into the memory.

6. The method of claim 1, comprising:
    writing a plurality of manifests from the memory to the persistent storage; and
    storing a plurality of identifiers in the tracking data structure of the first container index, wherein each of plurality of identifiers identifies a different manifest of the plurality of manifests.

7. The method of claim 1, comprising:
    determining whether a total number of identifiers in the tracking data structure of the first container index exceeds a threshold; and
    in response to a determination that the total number of identifiers in the tracking data structure of the first container index exceeds the threshold, generating a second container index.

8. The method of claim 1, comprising:
    determining whether a total number of identifiers in the tracking data structure of the first container index exceeds a threshold; and
    in response to a determination that the total number of identifiers in the tracking data structure of the first container index exceeds the threshold, flagging the first container index as a permanent container index.

9. A non-transitory machine-readable medium storing instructions executable by a processor to:

load a manifest from persistent storage into memory, wherein the manifest specifies an order of data units in a data stream;
load a first container index from persistent storage into the memory, wherein the first container index:
comprises a tracking data structure including identifiers of manifests;
includes information specifying storage locations of a plurality of data units; and
is associated with the manifest loaded into the memory;
determine whether the tracking data structure of the first container index includes an identifier of the manifest; and
in response to a determination that the tracking data structure of the first container index does not include the identifier of the manifest, discard the manifest.

10. The non-transitory machine-readable medium of claim 9, including instructions executable by the processor to:
in response to a determination that the tracking data structure of the first container index includes the identifier of the manifest, resume a deduplication operation using the manifest.

11. The non-transitory machine-readable medium of claim 10, including instructions executable by the processor to:
prior to loading the manifest from the persistent storage into the memory, detect a reset event during the deduplication operation; and
in response to detecting the reset event during the deduplication operation, load the manifest from the persistent storage into the memory.

12. The non-transitory machine-readable medium of claim 10, including instructions executable by the processor to, prior to loading the manifest from the persistent storage into the memory:
update the manifest in memory during the deduplication operation;
update the first container index based on the updated manifest; and
after updating the first container index based on the updated manifest, store an identifier of the manifest in the tracking data structure of the first container index.

13. The non-transitory machine-readable medium of claim 9, including instructions executable by the processor to, prior to loading the first container index from the persistent storage into the memory:
identify the first container index based on at least one field of the manifest loaded into the memory; and
in response to an identification of the first container index based on the at least one field, loading the first container index from the persistent storage into the memory.

14. The non-transitory machine-readable medium of claim 9, including instructions executable by the processor to:
in response to a determination that a total number of identifiers in the tracking data structure of the first container index exceeds a threshold, generate a second container index.

15. The non-transitory machine-readable medium of claim 9, including instructions executable by the processor to:
in response to a determination that a total number of identifiers in the tracking data structure of the first container index exceeds a threshold, flag the first container index as a permanent container index.

16. A storage system comprising:
a processor; and
a machine-readable storage storing instructions, the instructions executable by the processor to:
load a manifest from persistent storage into memory, wherein the manifest specifies an order of data units in a data stream;
load a first container index from persistent storage into the memory, wherein the first container index:
comprises a tracking data structure including identifiers of manifests;
includes information specifying storage locations of a plurality of data units; and
is associated with the manifest loaded into the memory;
determine whether the tracking data structure of the first container index includes an identifier of the manifest; and
in response to a determination that the tracking data structure of the first container index does not include the identifier of the manifest, discard the manifest.

17. The storage system of claim 16, including instructions executable by the processor to:
in response to a determination that the tracking data structure of the first container index includes the identifier of the manifest, resume a deduplication operation using the manifest.

18. The storage system of claim 17, including instructions executable by the processor to:
prior to loading the manifest from the persistent storage into the memory, detect a reset event during the deduplication operation; and
in response to detecting the reset event during the deduplication operation, load the manifest from the persistent storage into the memory.

19. The storage system of claim 17, including instructions executable by the processor to, prior to loading the manifest from the persistent storage into the memory:
update the manifest in memory during the deduplication operation;
update the first container index based on the updated manifest; and
after updating the first container index based on the updated manifest, store an identifier of the manifest in the tracking data structure of the first container index.

20. The storage system of claim 16, including instructions executable by the processor to:
in response to a determination that a total number of identifiers in the tracking data structure of the first container index exceeds a threshold, flag the first container index as a permanent container index.

* * * * *